Jan. 18, 1955     E. P. CUBER     2,699,702
MOTION-PICTURE PROJECTOR
Filed April 28, 1953     2 Sheets-Sheet 1
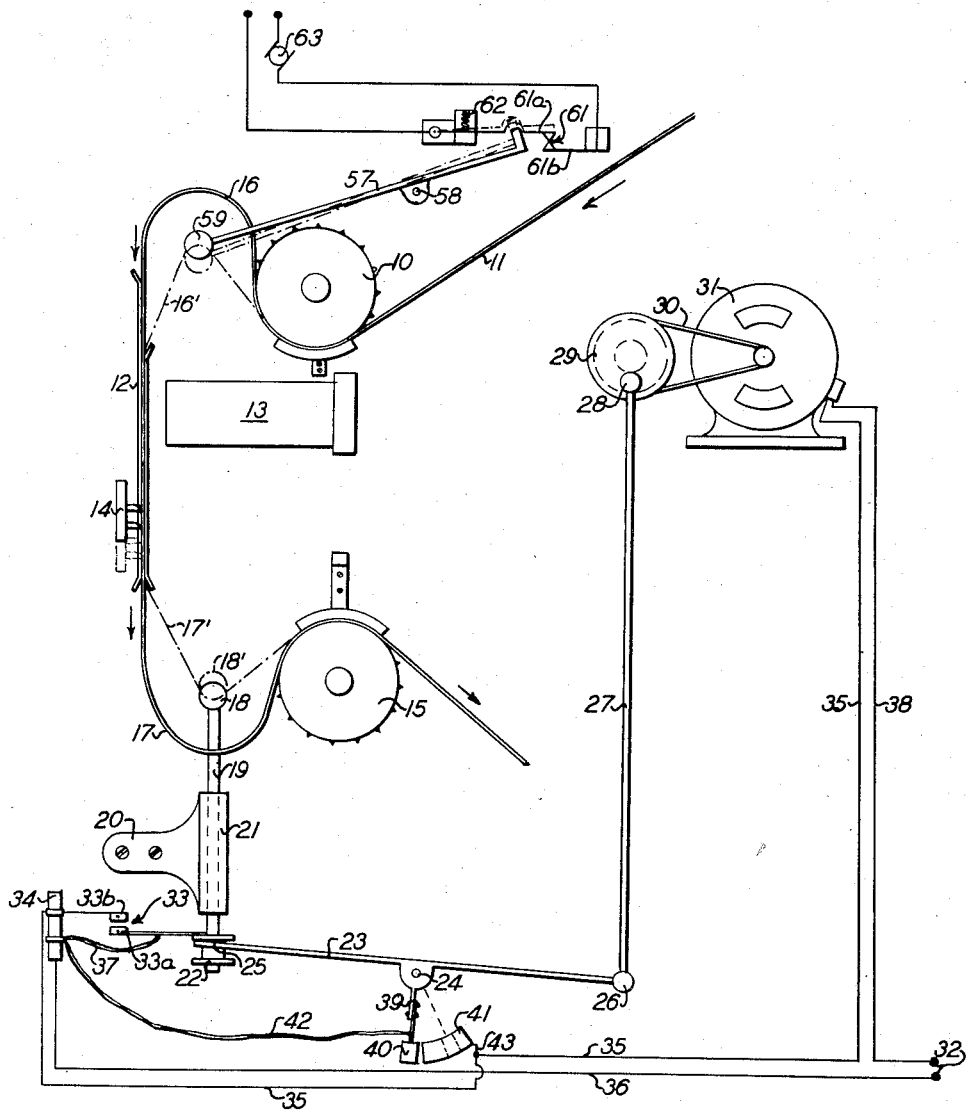
INVENTOR
EDUARDO PUCHADES CUBER
BY *Haseltine Lake & Co.,*
AGENTS Jan. 18, 1955  E. P. CUBER  2,699,702
MOTION-PICTURE PROJECTOR
Filed April 28, 1953  2 Sheets-Sheet 2
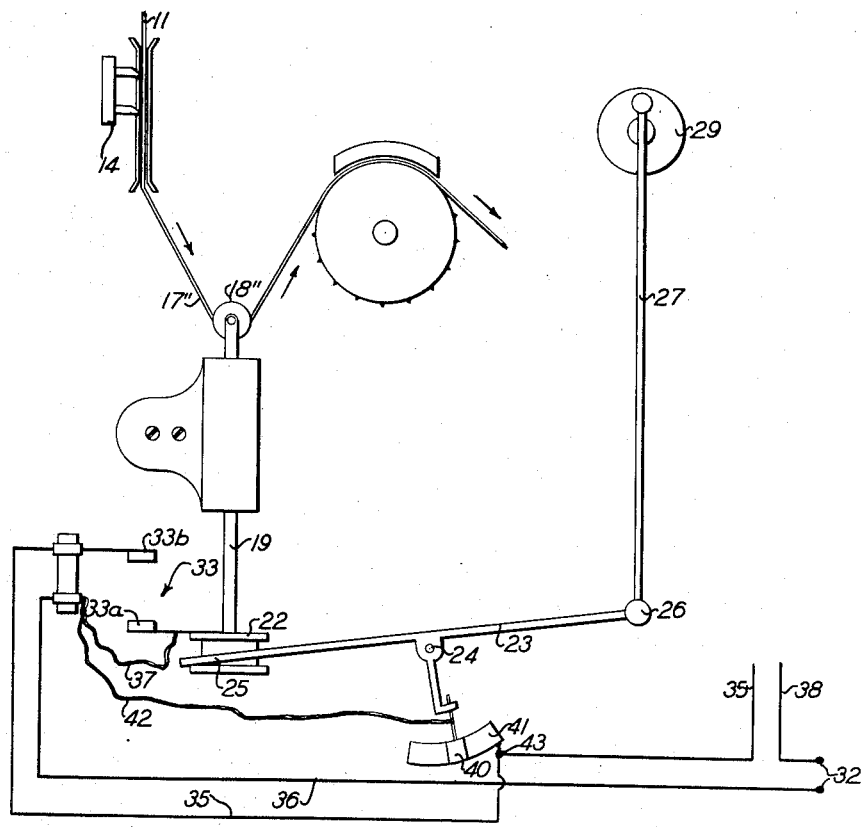
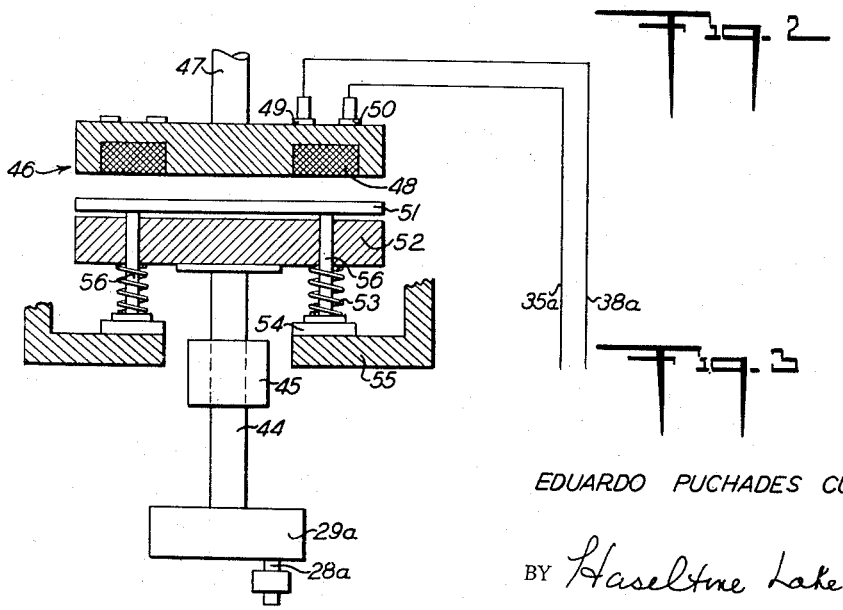
INVENTOR
EDUARDO PUCHADES CUBER
BY Haseltine Lake & Co.,
AGENTS

# United States Patent Office 2,699,702
Patented Jan. 18, 1955

2,699,702

MOTION-PICTURE PROJECTOR

Eduardo Puchades Cuber, Caracas, Venezuela

Application April 28, 1953, Serial No. 351,668

11 Claims. (Cl. 88—18.4)

The present invention relates generally to motion picture projectors, and is particularly directed to improvements in motion picture projectors of the kind in which the film is intermittently moved past the light source and the lens and shutter system by a cam operated claw assembly.

In motion picture projectors of the kind in which the film is intermittently moved past the light source and the lens and shutter system by a cam operated claw assembly, instead of by a Maltese cross or Geneva gear assembly, it is necessary to maintain substantial slack, in the form of loose loops of the film, both before and after the location at which the cam operated claw assembly acts on the film so that the intermittent movement of the film in the area of the area of the light source and the lens and shutter system can be achieved without overcoming the inertia of the reel on which the film is stored and without imposing relatively large forces or stresses on the relatively fragile film. However, quite frequently, by reason of the film being worn or otherwise in poor condition, the slack providing loops in the film are lost or taken-up and it is then necessary to halt the operation of the projector in order to avoid further damage to the film and possibly to the projector itself. The necessity of repeatedly halting the operation of the projector to restore the slack providing loops is obviously objectionable in that it interrupts the film and also causes loss of some of the film. Since the smaller projectors, for example, those handling 16 mm. film or smaller, are the ones usually provided with cam operated claw assemblies for intermittently feeding the film, and since such projectors are most often employed for the projection of films at home or in schools and the like in educational programs where the films are not handled by skilled professional projectionists and are more likely to be subjected to rough usage causing the defects which result in the loss of the slack or loops, it is apparent that the interruptions and the need for readjustment of the film may occur with annoying frequency.

While projectors of the kind referred to above have been provided with means for halting the operation automatically when the slack or loops are taken-up, this merely prevents further damage to the film or possible damage to the projector and does not avoid the objectionable interruptions or the necessity for manually re-establishing the slack in the film after the projector has been automatically halted. Some projectionists seek to avoid the objectionable interruptions by manually maintaining a steady pull on the film, but this requires constant and vigilant supervision by the operator.

Accordingly, it is an object of the present invention to provide mechanism, in a motion picture projector of the described character, for automatically restoring the slack to the film when the slack providing loops are taken up so that the projector can operate continuously without damage to the film or to the projector itself.

In accordance with the present invention, the above, and other objects, features and advantages, are achieved in a motion picture projector of the described character by providing a roller engageable with the slack providing loop of the film disposed between the cam operated claw mechanism and the take-up sprocket. The roller is carried by a reciprocatable stem or rod and is normally held in a position out of engagement with the film loop. When the film loop is taken up, the film engages the roller and moves the latter in one direction to close switch contact means associated with the roller supporting stem. The switch contact means control the operation of means for rocking a lever which at one end has a lost motion connection to the roller supporting stem, and the rocking of the lever causes longitudinal reciprocation of the roller supporting stem through a single stroke during which the roller pulls on the film to reestablish the slack providing loop. During this reciprocating stroke of the roller supporting stem, the switch contact means associated with the latter are opened and the continued operation of the means causing rocking of the lever is controlled by a switch arrangement associated with the lever to provide a single complete reciprocating stroke of the stem before rocking of the lever is halted. Further, in accordance with the present invention, it is preferable to provide an arrangement associated with the film loop between feeding sprocket or wheel and the cam operated claw mechanism to halt the operation of the projector when that film loop is taken up.

In order that the invention may be fully understood, an illustrative embodiment thereof is hereinafter described in detail and shown in the accompanying drawings, forming a part hereof and wherein:

Fig. 1 is a diagrammatic side elevational view of mechanism embodying the present invention and shown associated with only those parts of a conventional motion picture projector necessary for an understanding of the invention;

Fig. 2 is a fragmentary view, similar to a portion of Fig. 1, but showing the parts in the act of re-establishing the film loop; and Fig. 3 is a fragmentary diagrammatic top plan view partly in section, showing a portion of the mechanism constructed in accordance with another embodiment of the invention.

Referring to the drawings in detail, and initially to Figs. 1 and 2, the elements or parts of a motion picture projector essential to an understanding of the present invention are there shown schematically and include a feeding sprocket 10 for drawing the film 11 from a reel (not shown) and having teeth on its periphery to engage in the perforations formed along at least one side of the film. From the feeding sprocket 10, the film 11 is led through a guide 12 past a light source, lens and shutter arrangement 13. The film 11 is moved intermittently through the guide 12 by a claw mechanism 14 which is reciprocated in the usual manner by a cam (not shown) and engages the perforations of the film. After leaving the guide 12, the film 11 is led over a take-up sprocket 15, which is similar to the feeding sprocket 10, and then the film is led to a take-up reel (not shown). In motion picture projectors of the kind referred to herein, that is, projectors in which the feeding and take-up sprockets 10 and 15 are rotated continuously by a suitable drive (not shown) and the intermittent movement of the film past the light source, lens and shutter 13 is effected by a cam operated claw mechanism, it is necessary to maintain slack in the film between the feeding sprocket 10 and the claw mechanism 14, as provided by the loop 16 of Fig. 1 and also between the claw mechanism 14 and the take-up sprocket 15, as provided by the loop 17 of Fig. 1. The slack provided by the loops 16 and 17 ensures that no great resistance will be imposed against the movement of the film through the guide 12. If either the loop 16 or the loop 17 is taken up, the claw mechanism 14 will tear the perforations in the film or cause the film to break. It is apparent that the loop 17 will be taken up if the claw mechanism 14 encounters damaged perforations in the film with which it cannot properly engage and the feeding of the film through the guide 12 is thereby temporarily halted while the take-up sprocket 15 continues to rotate.

In order to avoid the necessity of halting the operation of the projector when the loop 17 is taken up to prevent the manual re-establishment of the loop 17, the present invention provides mechanism operating in response to the taking-up of the loop 17 and automatically re-establishing that loop without interrupting the operation of the projector. Such mechanism includes a roller 18 disposed within the loop 17 and normally held in a position out of engagement with the film. The roller 18 is rotatably mounted on the upper end of a vertical stem or rod 19 with the axis of rotation of the roller 18 extending at right angles to the longitudinal axis of the stem 19. A bracket 20 is secured fixedly to a suitable support (not shown) and is formed with a guide bushing 21 in which the stem 19 is vertically reciprocatable.

The structure provided for effecting the vertical reciprocation of the stem 19 and roller 18 includes a grooved collar or spool 22 fixed on the lower end of the stem 19. A lever 23 is rockably supported, intermediate its ends, on a pivot 24, and one of the ends of the lever is bifurcated or forked and loosely engages in the groove of the spool 22, as at 25. The loose engagement of the bifurcated end 25 of the lever 23 in the groove of the spool 22 provides a lost-motion connection between the lever 23 and the stem 19 to permit limited vertical displacement of the latter without corresponding rocking of the lever.

The other end 26 of the lever 23 is pivotally secured to one end of a connecting rod 27 which at its other end is attached to a crank pin 28 eccentrically mounted on a rotatable crank-wheel 29 so that, when the crank-wheel 29 is rotated, the lever 23 is rocked about the pivot 24.

In the embodiment of the invention illustrated in Figs. 1 and 2, the crank-wheel 29 is driven, through a belt and pulley arrangement 30, by a normally inoperative electric motor 31, but it is to be understood that the crank-wheel 29 may be rotated by other means, as hereinafter set forth in detail. The operation of the electric motor 31 is controlled by an electric circuit drawing power from a source 32 of either alternating or direct current. A switch 33 is interposed in the electric circuit and includes a movable contact 33a carried by the spool 22 and moving with the stem 19, and a fixed contact 33b carried by a suitable support 34. When the crank-wheel 29 is in its bottom-dead-center position (Fig. 1) the end 25 of the lever 23 is raised and supports the stem 19, with the roller 18 being free of the loop 17 and the contact 33a being spaced slightly from the fixed contact 33b so that the electric circuit for energizing the motor 31 is open.

When the loop 17 is taken-up for any reason it comes in contact with the roller 18, as at 17', and lifts the roller to the position 18'. Such lifting of the roller, made possible by the lost-motion connection between the spool 22 and lever end 25, moves the contact 33a into engagement with the contact 33b. The engagement of contact 33a with fixed contact 33b closes the electric circuit which includes a conductor 35 extending from the contact 33b to one terminal of the motor 31, a conductor 36 extending from one side of the source 32 to a terminal on the switch support 34 to which the movable contact 33a is connected by a flexible lead 37, and a conductor 38 extending from the other terminal of the motor 31 to the other side of the electric source 32. Thus, the switch 33 is in series with the motor 31 and closing of the switch 33 causes energization of the motor to begin the rotation of the crank-wheel 29 from its bottom-dead-center position.

However, as the crank-wheel 29 rotates from its bottom-dead-center position shown in Fig. 1, the lever 23 is rocked and the lever end 25 acts on the spool 22 to lower the stem 19. Downward movement of the stem 19, with the roller 18 engaging the taken-up loop 17, causes separation of the contacts 33a and 33b. In order to continue the energization of the motor 31 until the roller 18 has been lowered sufficiently to re-establish the loop 17, the lever 23 has an arm 39 extending from the central portion thereof and carrying a contact brush 40 for sliding engagement with a fixed contact segment 41. The segment 41 is disposed so that the brush contact 40, which is normally spaced from the segment (Fig. 1), comes into engagement with the segment 41 when the lever 23 has been rocked sufficiently in the counterclockwise direction, as viewed in the drawings, to cause separation of the contact 33a from the contact 33b during the downward movement of the roller 18 and stem 19.

The brush contact 40 and contact segment 41 constitute a second switch which is connected in parallel with the first switch 33 to provide an alternative course for the current energizing the motor 31. Such parallel connection of the switches is achieved by a flexible conductor 42 extending from the movable brush contact 40 to the terminal of the switch 33 to which the contact 33a is connected by the lead 37, and a conductor 43 connected between the contact segment 41.

Thus, the initial movement of the crank-wheel 29, from its bottom-dead-center position, is caused by closing of the contacts 33a and 33b in response to the action of the taken up loop 17' on the roller 18', and the further rotation of the crank-wheel, after the contacts 33a and 33b have been separated by downward movement of the stem 19, results from the closing of the contacts 40 and 41. When the crank-wheel 29 reaches its top-dead-center position (Fig. 2), the lever 23 has depressed the stem 19 and the lowered roller 18" has drawn the film into a loop 17" by slipping the film 11 past the pawl shaped teeth of the claw mechanism.

As the crank-wheel 29 moves past its top-dead-center position, the stem 19 is moved upwardly and the roller 18 is spaced from the newly formed loop 17. When the crank-wheel has returned to its bottom-dead-center position (Fig. 1) the brush contact 40 again moves off the contact segment 41 and, since the roller 18 is free of the film loop, the upper flange of the spool 22 rests on the lever end 25 and the contacts 33a and 33b are also separated to open both of the alternative circuits for energizing the motor 31 thereby halting the rotation of crank-wheel 29 at its bottom-dead-center position. The mechanism is then conditioned to repeat the operation of reestablishing the loop 17 when the latter is again taken-up. Thus, the described device operates, without interrupting the normal operation of the motion picture projector, to repeatedly re-establish the loop 17, whenever the latter is taken-up, and thereby prevent further damage to the film or to the projector itself.

While the parallel switches formed by the contacts 33a and 33b and by the contacts 40 and 41 are employed in the embodiment of Figs. 1 and 2 to control the energization of the separate motor 31 driving the crank-wheel 29, that crank-wheel may be driven from the usual motor driving the rest of the elements of the projector, such as, the sprockets 10 and 15, and the switches can control a magnetic clutch interposed in the drive of the crank-wheel. For example, in Fig. 3, the crank-wheel 29a, corresponding to the crank-wheel 29 of the first described embodiment, carries an eccentric crank-pin 28a, as before, and the crank-wheel 29a is carried by a shaft 44 supported in a suitable bearing 45. A magnetic clutch 46 is provided between the shaft 44 and a shaft 47 which is driven from any other continuously rotated element of the projector, for example, the sprocket 10 or the sprocket 15, by any suitable transmission means (not shown). The magnetic clutch 46 may include a coil element 48 fixed to the shaft 47 and having slip rings 49 and 50 contacted by suitable brushes at the ends of conductors 35a and 38a which correspond to the conductors 35 and 38 of Fig. 1. An armature 51 is axially movable on a member 52 secured to the shaft 44 and is urged away from the coil 48 by springs 53. When the coil 48 is energized, it attracts the armature 51 and the shaft 44 is coupled to the driven shaft 47 to rotate the crank-wheel 29a, and, when the coil 48 is deenergized, the armature 51 is freed from the coil element and rotation of the crank-wheel is halted. In order to cause the instantaneous braking of the rotation of the crank-wheel 29a when the coil 48 is de-energized, brake shoes 54 may be supported by pins 56 carried by the armature 51 and movable axially with the latter to frictionally contact a fixed braking surface 55, when the armature 51 is spring urged away from the coil element 48. In any event, it is to be understood that the structure of Fig. 3 is merely intended as an alternative for the motor of Fig. 1 and that the other elements described in connection with the embodiment of Figs. 1 and 2 are also used with the structure of Fig. 3 and operate in the same manner.

As seen in Fig. 1, it is preferable, in accordance with the present invention, to provide mechanism for completely halting the operation of the motion picture projector when the loop 16 in the film is taken up, for example, by the inoperativeness of the feeding sprocket 10. Such mechanism may include a lever 57 pivotally mounted intermediate its ends on a pivot 58 and having a roller 59 at one end disposed within the loop 16. The end of the lever 57 remote from the roller 59 carries a switch actuating insulated block 60 which is disposed to engage the movable contact 61a of a switch 61. A spring 62 acts on the movable contact 61a and yieldably urges the latter against a fixed contact 61b completing the switch 61. The switch 61 is in series with the motor 63 furnishing the main motive power for the projector, for example, for the continuously rotated sprockets 10 and 15.

The roller 59 is normally out of contact with the film loop 16, as shown in full lines in Fig. 1, and the spring 62 maintains the contact 61a against the contact 61b. However, when the loop between the feeding sprocket 10 and the guide 12 is taken up, as shown in broken lines at 16' on Fig. 1, the loop bears down on the roller 59 to rock the lever 57 so that the block 60 moves the contact 61a away from the contact 61b and breaks the circuit to the main motor thereby halting the projector so that the source of the trouble can be located and corrected before the film and the projector are unnecessarily damaged.

From the foregoing, it is apparent that the present invention provides mechanism, in a motion picture projector of the described character, for automatically re-establishing the slack providing loop in the film between the take-up sprocket and the claw mechanism so that the projector can operate continuously even when the film is imperfect and without causing further damage to the film or to the projector.

While particular embodiments of the invention have been shown and described in detail, it is to be understood that the present invention is not limited to those precise embodiments and that various changes and modifications can be effected therein, by a person skilled in the art, without departing from the scope or spirit of the invention as defined in the appended claims.

What is claimed is:

1. In a motion picture projector having a light source, lens and shutter arrangement, a guide for leading the film past that arrangement, a claw mechanism for intermittently advancing the film through the guide, and feeding and take-up sprockets for continuously moving the film toward and away from the claw mechanism with U-shaped slack providing loops being normally formed in the film between the feeding and take-up sprockets and the guide; mechanism for automatically re-establishing the loop in the film between the take-up sprocket and the guide and comprising a roller disposed within the film loop between the take-up sprocket and guide and normally held in a position out of engagement with the film, a stem having said roller attached to one end thereof, means guiding the movement of said stem longitudinally in the direction toward and away from the open end of the film loop related to said roller, means operative to reciprocate said roller from said normal position of the latter toward the closed end of the related film loop and back to said normal position; said roller reciprocating means including a movably supported member, means providing a lost-motion connection between said stem and said movably supported member so that said roller and stem are movable together toward the open end of the related film loop by taking-up of the latter without any corresponding movement of said movably supported member, and electrically energizable means for effecting movement of said movably supported member to cause reciprocation of said stem and roller; and means for initiating the operation of said roller reciprocating means in response to movement of said roller from said normal position in the direction away from the closed end of the related loop by taking-up of the latter and including an electric circuit for energizing said electrically energizable means effecting movement of the movably supported member, said electric circuit having a source of electric current and first and second switch means connected in parallel between said source and said electrically energizable means, said first and second switch means being normally open, said first switch means being operatively connected to said stem and being closed by movement of said roller from said normal position of the latter toward the open end of the related film loop, and said second switch means being operatively connected to said movably supported member and being closed during movement of the latter.

2. In a motion picture projector having a light source, lens and shutter arrangement, a guide for leading the film past that arrangement, a claw mechanism for intermittently advancing the film through the guide, and feeding and take-up sprockets for continuously moving the film toward and away from the claw mechanism with U-shaped slack providing loops being normally formed in the film between the feeding and take-up sprockets and the guide; mechanism for automatically re-establishing the loop in the film between the take-up sprocket and the guide and comprising a roller disposed within the film loop between the take-up sprocket and guide and normally held in a position out of engagement with the film, means operative to reciprocate said roller from said normal position of the latter toward the closed end of the related film loop and back to said normal position including electrical means which, when energized, renders said roller reciprocating means operative; and means for initiating operation of the roller reciprocating means in response to movement of said roller from said normal position in the direction away from the closed end of the related film loop by taking-up of the latter and including an electric circuit for energizing said electrical means, said electric circuit including a source of electric current and normally open first and second switch means connected in parallel between said source and said electrical means to provide alternative paths for energizing the latter, said first switch means being operatively associated with said roller and closed by said movement of the latter from said normal position toward the open end of the related loop, and said second switch means being operatively associated with said roller reciprocating means and being closed by the latter only during the operation of the roller reciprocating means effecting movement of said roller from said normal position toward the closed end of the related film loop and back to said normal position.

3. In a motion picture projector having a light source, lens and shutter arrangement, a guide for leading the film past that arrangement, a claw mechanism for intermittently advancing the film through the guide, and feeding and take-up sprockets for continuously moving the film toward and away from the claw mechanism with U-shaped slack providing loops being normally formed in the film between the feeding and take-up sprockets and the guide; mechanism for automatically re-establishing the loop in the film between the take-up sprocket and the guide and comprising a roller disposed within the film loop between the take-up sprocket and guide and normally held in a position out of engagement with the film, a stem having said roller attached to an end thereof and means slidably supporting said stem for longitudinal reciprocation of the latter in the direction of reciprocation of said roller; means operative to reciprocate said roller from said normal position of the latter toward the closed end of the related film loop and back to said normal position and including a lever, means pivotally supporting said lever, means providing a lost motion connection between one end of said lever and said stem so that the latter and said roller are movable to a limited extent without corresponding movement of said lever, and means operative to oscillate said lever; and means acting in response to movement of said roller from said normal position in the direction away from the closed end of the related loop by taking up of the latter to initiate operation of said roller reciprocating means so that said roller is then reciprocated for re-establishing the related film loop.

4. In a motion picture projector of the described character; mechanism according to claim 3 for automatically reestablishing the loop in the film between the take-up sprocket and the guide; wherein said means operative to oscillate the lever includes rotatable crank means, a connecting rod between said crank means and said lever, and means for rotating said crank means including electric means, said means for rotating said crank means being operative when said electric means is energized.

5. In a motion picture projector of the described character; mechanism according to claim 4 for automatically reestablishing the loop in the film between the take-up sprocket and the guide; wherein said electrical means includes an electric motor coupled to said crank means.

6. In a motion picture projector of the described character; mechanism according to claim 4 for automatically reestablishing the film loop between the take-up sprocket and the guide; wherein said means for rotating the crank means includes a rotated drive shaft and said electrical means includes an electromagnetic clutch interposed between said drive shaft and said crank means and effective, when electrically energized, to couple said rotated drive shaft to said crank means.

7. In a motion picture projector of the described character; mechanism according to claim 4 for automatically reestablishing the film loop between the take-up sprocket and the guide; wherein said means operative to oscillate the lever further includes brake means operative when said electric means is deenergized to resist rotation of said crank means.

8. In a motion picture projector of the described character; mechanism according to claim 4 for automatically re-establishing the film loop between the take-up sprocket and the guide; wherein said means initiating operation of the roller reciprocating means includes an electric circuit for energizing said electric means, said electric circuit including a source of electric current and normally open first and second switch means connected in parallel between said source and said electric means to provide alternative paths for energizing the latter, said first switch means being operatively connected to said stem and closed by displacement of the latter caused by movement of said roller from said normal position toward the open end of the related film loop, and said second switch means being operatively connected to said lever and closed during the oscillation of the latter from and to the position of said lever corresponding to said normal position of said roller.

9. In a motion picture projector of the described character; mechanism according to claim 8 for automatically reestablishing the film loop between the take-up sprocket and the guide; wherein said first switch means includes a movable contact carried by said stem and a fixed contact mounted in the path of movement of said movable contact in the direction corresponding to the movement of the roller from said normal position toward the open end of the related loop, said fixed contact being spaced from said movable contact when said roller is in said normal position.

10. In a motion picture projector of the described character; mechanism according to claim 8 for automatically reestablishing the film loop between the take-up sprocket and the guide; wherein said second switch means includes a radial arm extending from said lever and carrying a movable brush contact, and a fixed contact segment disposed to be free of said brush contact when said lever is in a position corresponding to said normal position of the roller and contacted by said brush contact during the oscillation of said lever from and to said position of the lever corresponding to said normal position of the roller.

11. In a motion picture projector of the described character; mechanism according to claim 10 for automatically reestablishing the film loop between the take-up sprocket and the guide; wherein said first switch means includes a movable contact carried by said stem and a fixed contact mounted in the path of travel of said movable contact in the direction corresponding to the movement of said roller from said normal position toward the open end of the related loop, said fixed contact of the first switch means being spaced from the related movable contact when said roller is in said normal position thereof.

References Cited in the file of this patent

UNITED STATES PATENTS

| 2,332,079 | Hoehn | Oct. 19, 1943 |
| 2,371,836 | Masterson | Mar. 20, 1945 |

FOREIGN PATENTS

| 331,815 | Germany | Jan. 13, 1921 |